United States Patent
Ackermann

(10) Patent No.: US 12,410,836 B2
(45) Date of Patent: Sep. 9, 2025

(54) VISCOUS CLUTCH WITH FRONT-MOUNTED ELECTROMAGNETIC COIL, MODULAR VALVE AND FRONT HUB SUBASSEMBLIES FOR A VISCOUS CLUTCH, AND METHOD OF MAKING

(71) Applicant: HORTON, INC., Roseville, MN (US)

(72) Inventor: Jonathan Ackermann, Circle Pines, MN (US)

(73) Assignee: HORTON, INC., Roseville, MN (US)

( * ) Notice: Subject to any disclaimer, the term of this patent is extended or adjusted under 35 U.S.C. 154(b) by 0 days.

(21) Appl. No.: 18/846,080

(22) PCT Filed: Feb. 28, 2023

(86) PCT No.: PCT/US2023/014054
§ 371 (c)(1),
(2) Date: Sep. 11, 2024

(87) PCT Pub. No.: WO2023/183118
PCT Pub. Date: Sep. 28, 2023

(65) Prior Publication Data
US 2025/0188999 A1   Jun. 12, 2025

Related U.S. Application Data

(60) Provisional application No. 63/269,873, filed on Mar. 24, 2022.

(51) Int. Cl.
*F16D 35/02* (2006.01)
(52) U.S. Cl.
CPC ......... *F16D 35/028* (2013.01); *F16D 35/021* (2013.01)

(58) Field of Classification Search
CPC ............................ F16D 35/024; F16D 35/028
See application file for complete search history.

(56) References Cited

U.S. PATENT DOCUMENTS

| | | | |
|---|---|---|---|
| 4,227,861 A | 10/1980 | LaFlame | |
| 4,346,797 A | 8/1982 | Bopp | |
| (Continued) | | | |

FOREIGN PATENT DOCUMENTS

| | | |
|---|---|---|
| CN | 1727650 A | 2/2006 |
| DE | 102011076745 A1 | 12/2012 |
| (Continued) | | |

OTHER PUBLICATIONS

International Search Report and Written Opinion in corresponding International application No. PCT/US2023/014054 dated Jun. 28, 2023.

*Primary Examiner* — Huan Le
(74) *Attorney, Agent, or Firm* — Westman, Champlin & Koehler, P.A.

(57) ABSTRACT

A viscous clutch assembly includes a rotationally fixed center shaft, a rotor rotatably supported on the center shaft, a housing rotatably supported on the center shaft, a working chamber, a reservoir carried by the rotor, an electromagnetic coil located at or near a front end of the center shaft, a valve subassembly magnetically operable to control flow of a shear fluid between the reservoir and the working chamber, a flux guide extending axially across a cover of the housing, and a magnetic flux insulating material positioned adjacent to and radially inward from the flux guide. A flux circuit located forward of the rotor connects the electromagnetic coil and the valve subassembly and passes through the flux guide and the center shaft, with the magnetic flux insulating material at least partially surrounded by the flux circuit.

23 Claims, 6 Drawing Sheets

(56) References Cited

U.S. PATENT DOCUMENTS

| | | |
|---|---|---|
| 5,025,906 A | 6/1991 | O'Neil et al. |
| 5,030,865 A | 7/1991 | Rockey et al. |
| 5,152,383 A | 10/1992 | Boyer et al. |
| 5,511,643 A | 4/1996 | Brown |
| 5,992,594 A | 11/1999 | Herrle et al. |
| 6,419,064 B1 | 7/2002 | Krammer |
| 6,443,283 B1 | 9/2002 | Augenstein et al. |
| 6,695,113 B2 | 2/2004 | Lutz |
| 7,293,636 B2 | 11/2007 | May |
| 7,588,132 B2 | 9/2009 | Shiozaki et al. |
| 7,621,386 B2 | 11/2009 | Light |
| 7,854,307 B2 | 12/2010 | Hennessy et al. |
| 7,886,886 B2 | 2/2011 | Schultheiss et al. |
| 7,913,825 B2 | 3/2011 | Boyer |
| 7,913,826 B2 | 3/2011 | Boyer |
| 7,946,400 B2 | 5/2011 | Hennessy et al. |
| 7,980,373 B2 | 7/2011 | Boyer |
| 8,100,241 B2 | 1/2012 | Hennessy et al. |
| 8,186,494 B2 | 5/2012 | Boyer |
| 8,596,438 B2 | 12/2013 | Boyer |
| 8,616,357 B2 | 12/2013 | Boyer |
| 9,133,893 B2 | 9/2015 | Tilly |
| 9,239,086 B2 | 1/2016 | Kubota et al. |
| 9,328,781 B2 | 5/2016 | Kubota et al. |
| 9,506,507 B2 | 11/2016 | Savela et al. |
| 10,557,508 B2 | 2/2020 | Hennessy |
| 10,589,619 B2 | 3/2020 | Stahl et al. |
| 11,333,207 B2 | 5/2022 | Hennessy |
| 11,441,621 B2 | 9/2022 | Hennessy |
| 11,635,113 B2 | 4/2023 | Cayton et al. |
| 2010/0140040 A1 * | 6/2010 | Hennessy ............. F16D 35/024 192/58.61 |
| 2016/0169235 A1 | 6/2016 | Ignatovich |
| 2017/0241490 A1 | 8/2017 | Krammer et al. |

FOREIGN PATENT DOCUMENTS

| | | | |
|---|---|---|---|
| EP | 0350585 B1 | 4/1993 | |
| WO | 2009030574 A1 | 3/2009 | |
| WO | WO-2011062856 A2 * | 5/2011 | ............. F16D 25/02 |
| WO | 2012024497 A2 | 2/2012 | |
| WO | 2014047430 A1 | 3/2014 | |
| WO | 2017062328 A1 | 4/2017 | |
| WO | 2018004833 A1 | 1/2018 | |
| WO | 2019213359 A1 | 11/2019 | |
| WO | WO-2021232034 A1 * | 11/2021 | ............. F01P 7/042 |

* cited by examiner

VISCOUS CLUTCH WITH FRONT-MOUNTED ELECTROMAGNETIC COIL, MODULAR VALVE AND FRONT HUB SUBASSEMBLIES FOR A VISCOUS CLUTCH, AND METHOD OF MAKING

CROSS-REFERENCE TO RELATED APPLICATION(S)

This Application is a Section 371 National Stage Application of International Application No. PCT/US2023/014054, filed Feb. 28, 2023 and published as WO 2023/183118 A1 on Sep. 28, 2023, in English, and claims priority to U.S. provisional patent application Ser. No. 63/269,873, filed Mar. 24, 2022.

FIELD

The present invention relates to an electromagnetically-actuated viscous clutch, a modular valve subassembly for a viscous clutch, and methods of making and using such assemblies and subassemblies.

BACKGROUND

Internal combustion engines, including diesel engines, are very popular for use in many applications, including mining and power generation. The engine needs to be cooled. A commonly preferred method of cooling is to attach a cooling fan to the engine. The cooling fan is typically driven via a pulley by the crank shaft of the engine. In many cases, the cooling fan is running at all times when the engine is running, whether cooling is needed or not. This represents the simplest method for achieving engine cooling. However, the fan can consume a substantial amount of power. The required fan power is typically around 10% of the rated power of the engine. Fan clutches are commonly used as a means of disconnecting or partially disconnecting the fan when peak cooling is not needed, thereby allowing selective control of fan operation. The power required by the fan is decreased accordingly, saving fuel, reducing noise, and increasing the useable power of the machine. One example of a prior art viscous fan clutch is found in PCT International Patent Application Pub. No. WO 2011/062856 A2.

It is desired to provide a viscous clutch assembly supported by a rotationally fixed mounting bracket with a front-mounted electromagnetic coil that can control operation of a valve with a relatively compact magnetic flux circuit as part of a relatively compact and relatively low mass overall assembly. The provision of an easy to install valve for the viscous clutch is also desired, and a method to relatively easily fabricate and assemble an entire viscous clutch mechanism and an entire viscous clutch assembly is also desired.

SUMMARY

In one aspect, a viscous clutch assembly includes a center shaft that is rotationally fixed and has a front end and a rear end opposite the front end, a rotor rotatably supported on the center shaft, a housing positioned adjacent to the rotor and rotatably supported on the center shaft, a working chamber, with the rotor and the housing defining at least portions of a boundary of the working chamber, a reservoir carried by the rotor and rotationally fixed to the rotor, an electromagnetic coil located at or near the front end of the center shaft and being rotationally fixed, a valve subassembly operable to control flow of a shear fluid between the reservoir and the working chamber and controllable using magnetic flux generated by the electromagnetic coil, a flux guide extending axially across a cover of the housing, and a magnetic flux insulating material positioned adjacent to and radially inward from the flux guide. A flux circuit connects the electromagnetic coil and the valve subassembly, such that the flux circuit is located forward of the rotor and passes through the flux guide and a portion of the center shaft. The magnetic flux insulating material can be at least partially surrounded by the flux circuit.

In another aspect, a method of making a viscous clutch includes providing a mounting bracket having a center shaft, rotatably mounting a rotor on the center shaft and positioning a housing base adjacent to the center shaft and the rotor, assembling a modular valve subassembly, securing the previously-assembled modular valve subassembly to the rotor, rotatably mounting a housing cover on the center shaft and securing the housing cover to the housing base, and securing an electromagnetic coil to the center shaft at or near a front end thereof with one or more wires for the electromagnetic coil extending rearward through a bore in the center shaft. Assembling the modular valve subassembly can include securing a reed valve element to an outer pole made of a ferromagnetic material, securing a spring to an armature, and securing the spring to the outer pole such that, when the modular valve subassembly is fully assembled, the armature is movable relative to the outer pole and further such that at least a seal portion of the reed valve element is located axially between the outer pole and the armature.

In another aspect, a modular valve subassembly for a viscous clutch includes a pole having a body having an annular shape and made of a ferromagnetic material, an armature made of a ferromagnetic material and configured as a plate, a spring securing the armature to the pole such that the armature is movable relative to the pole, and a reed valve element secured to the pole. The reed valve element can be positioned at least partially between the armature and the pole and can have a seal portion movable relative to the pole. The reed valve element and the spring can be secured to the pole at locations spaced from each other.

In yet another aspect, a viscous clutch assembly includes a center shaft that is rotationally fixed, a rotor rotatably supported on the center shaft, a housing positioned adjacent to the rotor and rotatably supported on the center shaft, a working chamber with the rotor and the housing defining at least portions of a boundary of the working chamber such that a shear fluid present in the working chamber can transmit torque between the rotor and the housing, a reservoir carried by the rotor and rotationally fixed to the rotor and having an outlet bore, an electromagnetic coil rotationally fixed to the center shaft at or near a front end of the center shaft, a valve subassembly operable to control flow of a shear fluid between the reservoir and the working chamber through the outlet bore and controllable using magnetic flux generated by the electromagnetic coil, and a front hub subassembly. The valve subassembly can include an outer pole having an annular body, an armature, a spring pivotally securing the armature to the outer pole, and a reed valve element pivotally secured to the outer pole and having a seal portion arranged adjacent to the outlet bore, configured such that selective actuation of the armature by applied magnetic flux exerts a force on the reed valve element to pivotally actuate the reed valve element against a spring bias force such that the seal portion selectively covers and uncovers the outlet bore. The front hub subassembly can include a flux guide, a set of bearings, and a magnetic flux insulator sleeve positioned adjacent to and radially in between the set of bearings and the flux guide. The front hub subassembly can be engaged between the center shaft and the housing with the flux guide extending axially across a portion of the housing with a front end of the flux guide separated from the electromagnetic coil by an air gap and with an opposite rear end of the flux guide separated from the outer pole by another air gap.

The present summary is provided only by way of example, and not limitation. Other aspects of the present invention will be appreciated in view of the entirety of the present disclosure, including the entire text, claims, and accompanying figures.

Figure 1:
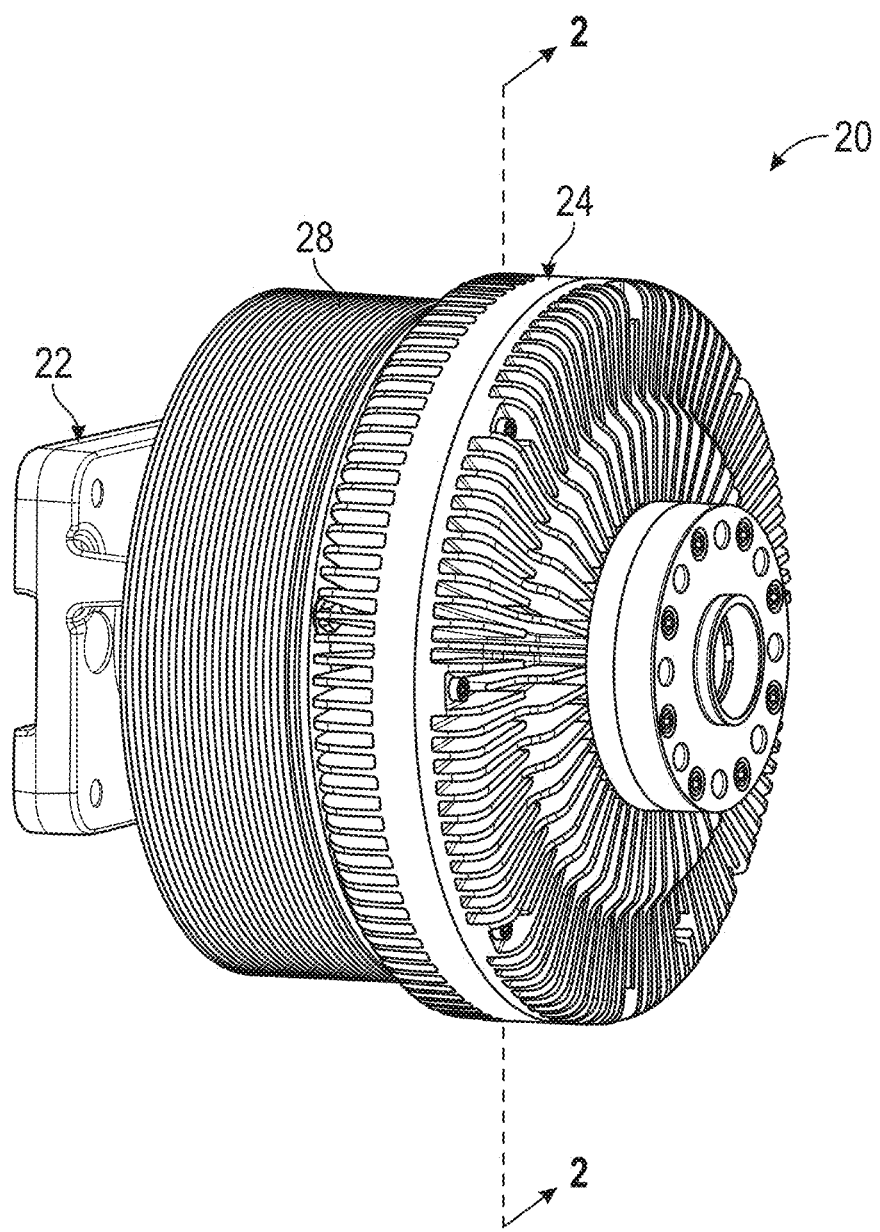
FIG. 1 is a front perspective view of a viscous clutch assembly according to an embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

DETAILED DESCRIPTION OF ILLUSTRATIVE EMBODIMENTS

In general, a viscous clutch assembly as presently disclosed includes a viscous clutch mechanism driven by a torque input, the viscous clutch mechanism supported on a mounting bracket that can be attached to a mounting location, such as a front of an engine or motor. The mounting bracket can have a center shaft that is rotationally stationary or fixed. The clutch mechanism generally includes a housing (which can be a multi-part assembly with a housing base and housing cover), a rotor, a reservoir, a working chamber adjoining the housing and rotor, a return pump, a valve subassembly, and an electromagnetic coil. The valve subassembly can be a modular valve subassembly that can be pre-assembled as a modular unit prior to being inserted and secured to other components of the clutch assembly. Moreover, in some embodiments, the valve subassembly can operate using essentially axial valve element actuation, such as generally axial pivoting motion, and further can utilize a reed valve element, any or all of which help to improve tolerance sensitivity and can operate more reliably than circumferentially rotating valve assemblies, for instance. Further, the valve subassembly and the electromagnetic coil can each be located outside of the reservoir, in some embodiments. A flux circuit links the electromagnetic coil and the valve subassembly. The flux circuit can be relatively compact in size, and can have a relatively small number of air gaps, a number of them radial air gaps, in order to promote efficient magnetic flux transmission and promote a relatively compact and relatively low-mass overall clutch mechanism. For instance, the flux circuit can be located forward of the rotor and radially inward of the reservoir, to help minimize its size and the number of air gaps. In some embodiments, a flux guide and/or a flux insulator sleeve can be utilized to help establish portions of the flux circuit, such as to axially traverse a cover of the housing through the flux guide with the flux insulator sleeve at an interior portion of the flux circuit to help avoid a magnetic flux short circuit. A shear fluid (e.g., silicone oil) is also provided within the clutch mechanism. A pulley or other suitable input mechanism can accept torque input to an input side of the clutch mechanism from a belt or the like. An output device, such as a fan, can be connected to an output side of the clutch mechanism. By controlling operation of the valve subassembly with the electromagnetic coil, a slip speed of the clutch mechanism can be essentially continuously controlled to transmit an output torque at a desired output speed from approximately 0-100% of the input speed. The disclosed viscous clutch assembly is suitable for use for fan cooling applications, such as in vehicular or other industrial settings, as well as other applications where it is desired to control torque transmission between an input and output. Numerous other features and benefits of the disclosed invention will be appreciated by persons of ordinary skill in the art in view of the entirety of the present disclosure, including the accompanying drawings.

Figure 2:
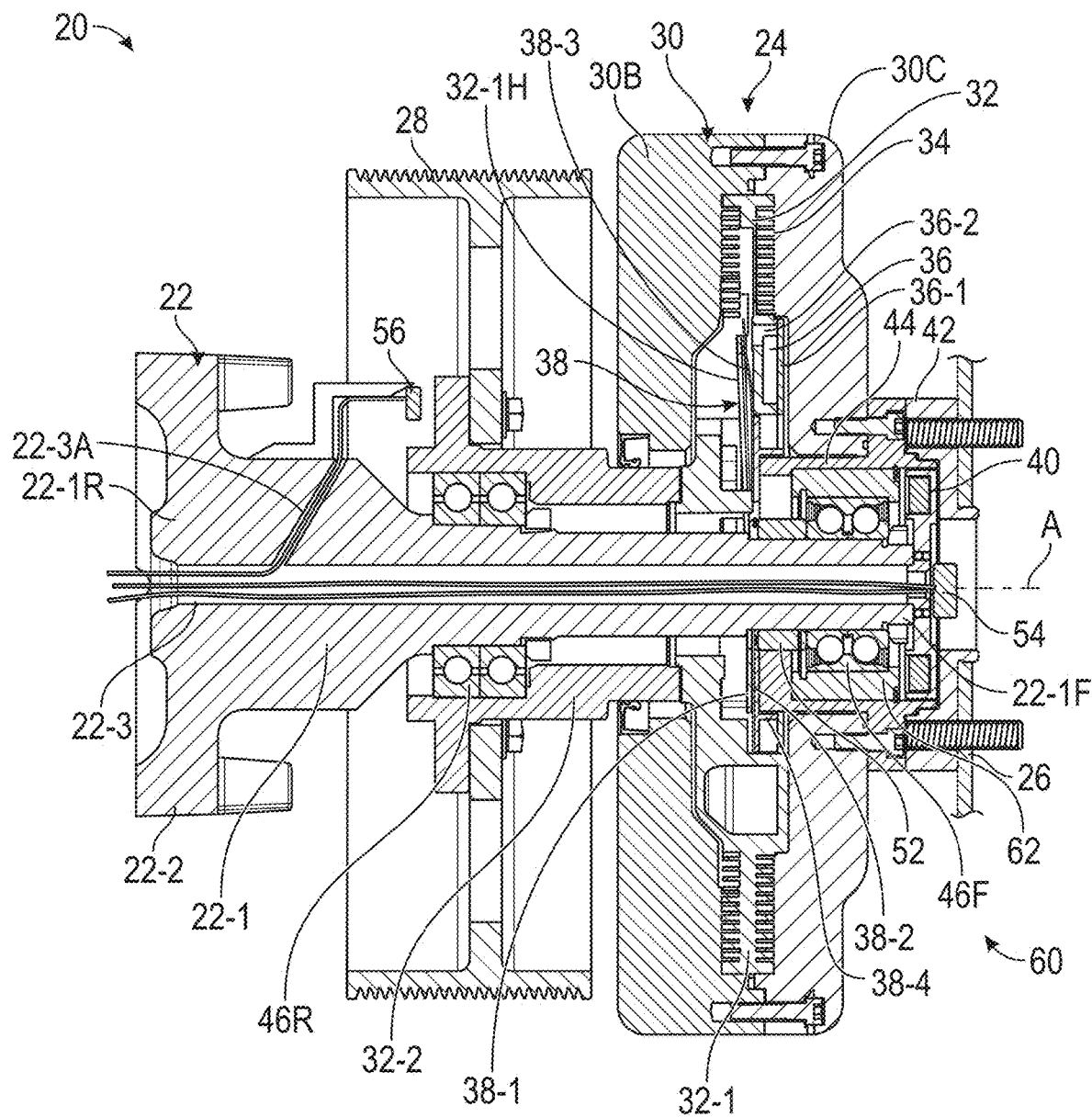
FIG. 2 is a cross-sectional view of the viscous clutch assembly, taken along line 2-2 of FIG. 1.

FIG. 1 is a front perspective view and FIG. 2 is a cross-sectional view of an embodiment of a viscous clutch assembly 20 taken along line 2-2 of FIG. 1. In the illustrated embodiment, the viscous clutch assembly 20 includes a mounting bracket (or journal bracket) 22 and a viscous clutch mechanism 24. A portion of a fan 26 is shown attached to the viscous clutch mechanism 24 in FIG. 2 but is omitted from FIG. 1 and subsequent figures. A pulley (or sheave) 28 is attached to the viscous clutch mechanism 24 as well.

The mounting bracket 22 of the illustrated embodiment includes a center shaft 22-1 and a flange 22-2. The flange 22-2 allows for attachment to a rotationally fixed mounting location. The center shaft 22-1 is rotationally fixed relative to the mounting location and/or the flange 22-2 (that is, the center shaft 22-1 does not rotate). The center shaft 22-1 defines an axis of rotation A of the clutch mechanism 24, and has a front end (or distal end) 22-1F and an opposite rear end 22-1R. The flange 22-2 is located at or near the rear end 22-1R. A bore 22-3 can extend through an axial length of the center shaft 22-1, as well as through the flange 22-2. In the illustrated embodiment the bore 22-3 is located at the center of the center shaft 22-1, but in other embodiments can be located in a different position and need not be fully enclosed by material of the center shaft 22-1. Additional bores or passageways can be provided as well, such as auxiliary passage 22-3A that connects to the bore 22-3 and extends at an angle as shown in the illustrated embodiment. The mounting bracket 22 is made of a material that is structurally strong for supporting the entire assembly, typically cast iron or steel, and can be made as a single monolithic piece. The mounting bracket 22 is made of a magnetically conductive material, such as a ferromagnetic material, as part of the electromagnetic control flux circuit, as discussed further below. Cast iron or steel are ferromagnetic materials that work well for magnetic flux transmission.

As shown in FIG. 2, the viscous clutch mechanism 24 of the illustrated embodiment includes a housing 30, a rotor 32, a working chamber 34, a reservoir 36, a valve subassembly 38, an electromagnetic coil 40, an adapter 42, and a flux guide 44.

The housing 30 is located adjacent to the rotor 32 and can partially or completely surround the rotor 32. In the illustrated embodiment, the housing 30 is a multi-part assembly that includes a base 30B (in the rear) and a cover 30C (in the front) that are secured together. The cover 30C can be rotationally supported on the center shaft 22-1 of the mounting bracket 22 by a set of bearings 46F via a front hub unit (described further below), and the base 30B can be supported partly or entirely by the cover 30C in a cantilevered configuration. A seal can be provided between the base 30B of the housing 30 and the rotor hub. In the illustrated embodiment, the housing 30 serves as an output side of the clutch mechanism 24 to controllably deliver a torque output at a selected output speed.

The rotor 32 includes a disc 32-1 and a hub 32-2, in a rotationally fixed relationship such that the disc 32-1 and the hub 32-2 always rotate at the same speed. The disc 32-1 and the hub 32-2 can be separate components mechanically secured together with suitable fasteners, and likewise the disc 32-1 and/or the hub 32-2 can be made of multiple components connected together, as desired. For example, the disc 32-1 can be made of aluminum and the hub 32-2 can be made of aluminum or steel. The disc 32-1 can generally extend radially relative to the axis of rotation A and the hub 32-2 can encircle the center shaft 22-1 and can extend axially rearward from the disc 32-1. In the illustrated embodiment, a set of bearings 46R rotatably supports the hub 32-2 of the rotor 32 on the center shaft 22-1 of the mounting bracket 22. The sets of bearings 46F and 46R are axially spaced from each other with the set of bearings 46F located at or near a distal or front end 22-1F of the center shaft 22-1. In that way, the bearings 46F and 46R separately rotatably support the housing 30 and the rotor 32, respectively, on the center shaft 22-1, allowing the housing 30 and the rotor 32 to rotate relative to each other relative to the rotationally fixed mounting bracket 22. In the illustrated embodiment, the rotor 32 (and the pulley 28) serves as an input side of the clutch mechanism 24 and accepts a torque input.

The pulley 28 can be attached and rotationally fixed to the hub 32-2 such that the pulley 28 always rotates at the same speed as the rotor 32. The pulley 28 can engage a belt (not shown) that provides an input torque from an engine, motor, or the like. In the illustrated embodiment, the set of bearings 46R is substantially axially aligned with the pulley 28, that is, the pulley 28 can be positioned directly over the bearings 46R in an axial direction. The bearings 46R are preferably deep groove ball bearings but could alternatively be tapered roller bearings, angular contact ball bearings, or the like. In alternative embodiments, a different device such as a gear, sprocket, or the like can be substituted for the pulley 28, as desired for particular applications.

The working chamber 34 provides a volume within the viscous clutch mechanism 24 that is at least partially bounded by portions of the housing 30 and the rotor 32. The housing 30 and the rotor 32 can each have a series of annular ribs interspersed with each other along the working chamber 34, separated by a small gap, to help increase a surface area of the working chamber 34. Shear fluid (for example, silicone oil) present in the working chamber 34 during operation of the clutch mechanism 24 is sheared by fluid friction due to the relative movement of the rotor 32 and the housing 30. The shearing process imparts a tangential force that is transferred from the input (e.g., the rotor 32) to the output (e.g., the housing 30). By controlling the volume of shear fluid present in the working chamber, the viscous clutch mechanism 24 can selectively control torque transmission and an output slip speed of the viscous clutch assembly 20. General principles of operation of viscous clutches will be understood by those of ordinary skill in the art.

The reservoir 36 can hold a supply of the shear fluid. In the illustrated embodiment, the reservoir 36 is fixed to and carried by the rotor 32, specifically the disc 32-1. A portion of a boundary of the reservoir 36 can be formed by the disc 32-1 or other portion of the rotor 32, and a reservoir cover 36-1 can be attached to the rotor 32 (for instance, to the disc 32-1) to define a further boundary of the reservoir 36. When the viscous clutch mechanism 24 is disengaged, most or all of the shear fluid is stored in the reservoir 36. Because the rotor 32 and reservoir 36 are attached together (and to the pulley 28) on the input side of the viscous clutch mechanism 24, they are always rotating at full input speed whenever there is a torque input. Thus, the shear fluid present in the reservoir 36 is spinning as well and under pressure. This is desirable so that when the shear fluid is to be released into the working chamber 34 (by the valve subassembly), it moves rapidly out of the reservoir 36 due to the pressure and available kinetic energy. The reservoir 36 includes an outlet bore (or hole) 36-2, which allows the shear fluid to flow from the reservoir 36 to the working chamber 34 (when permitted by the valve subassembly 38). In the illustrated embodiment, the outlet bore 36-2 extends substantially axially and is located at or near an outer diameter of the reservoir 36, with an exit end facing rearward (see also FIG. 5B). Furthermore, in some embodiments, a boss 36-3 can be formed at a boundary of the reservoir 36 adjoining the outlet bore 36-2, such as in a wall of the reservoir 36 formed by a portion of the disc 32-1 of the rotor 32. The boss 36-3 protrudes axially or otherwise stands proud of other portions of the reservoir boundary wall. In alternative embodiments, a recess could optionally be provided in the boundary wall of the reservoir 36, such as only at one side of the outlet bore 36-2, and the boss 36-3 omitted.

A pump can provide passive pumping of the shear fluid from the working chamber 34 back to the reservoir 36 when there is a torque input to the viscous clutch mechanism 24, utilizing at least one wiper 48 and return bore 50. In the illustrated embodiment, there are two wipers 48 and two corresponding return bores 50 located diametrically opposite each other and carried by or extending through the disc 32-1 of the rotor 32, with the bores 50 emptying into the reservoir 36 (see FIG. 5B). Operation of such pumps in viscous clutches is well known in the art.

A valve subassembly 38 is provided for the purpose of selectively controlling flow of the shear fluid between the reservoir 36 and the working chamber 34. In the illustrated embodiment, the valve subassembly 38 controls flow of the shear fluid out of the reservoir 36 by opening and closing (or covering and uncovering, or sealing and unsealing) the outlet bore 36-2 that connects the reservoir 36 to the working chamber 34. The valve subassembly 38 of the illustrated embodiment is configured as a modular unit that includes an armature 38-1, a spring 38-2, a reed valve element 38-3, and a pole 38-4. The valve subassembly 38 can be secured to and carried by the rotor 32, for example, partly or entirely at a front side of the rotor 32 and, for example, such that at least a portion of the reservoir 36 is located in between the valve subassembly 38 and the electromagnetic coil 40 in the axial direction.

Figure 3A:
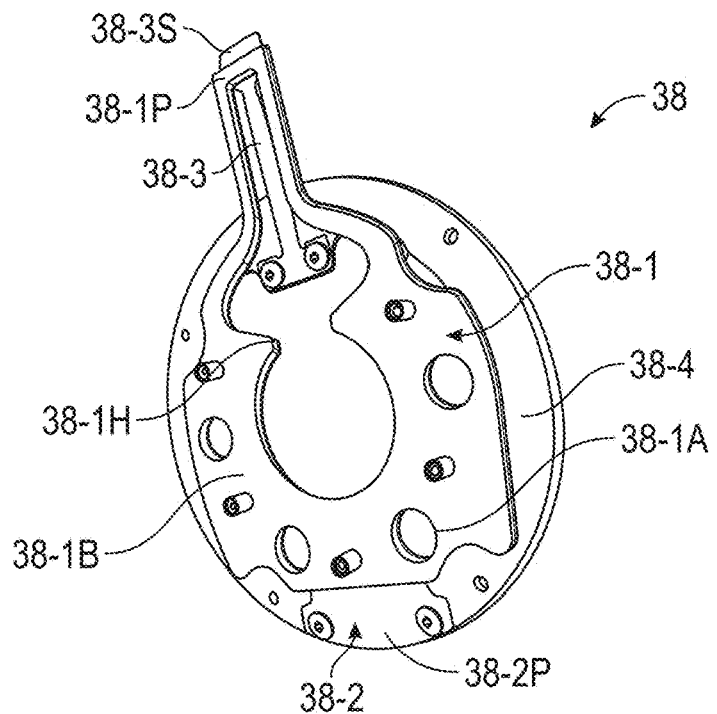
FIG. 3A is a rear perspective view of a valve subassembly of the viscous clutch assembly, shown in isolation.
Figure 3B:
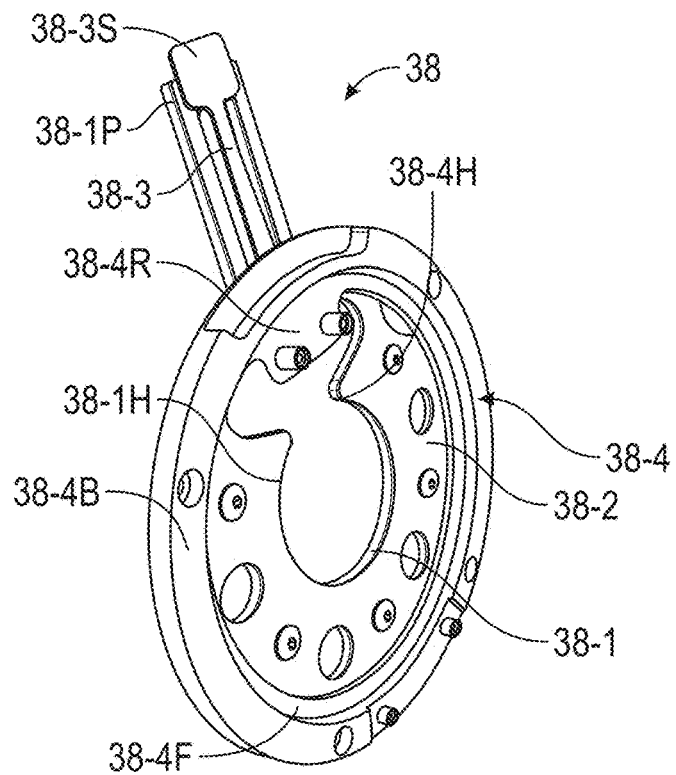
FIG. 3B is a front perspective view of the valve subassembly, shown in isolation.
Figure 4:
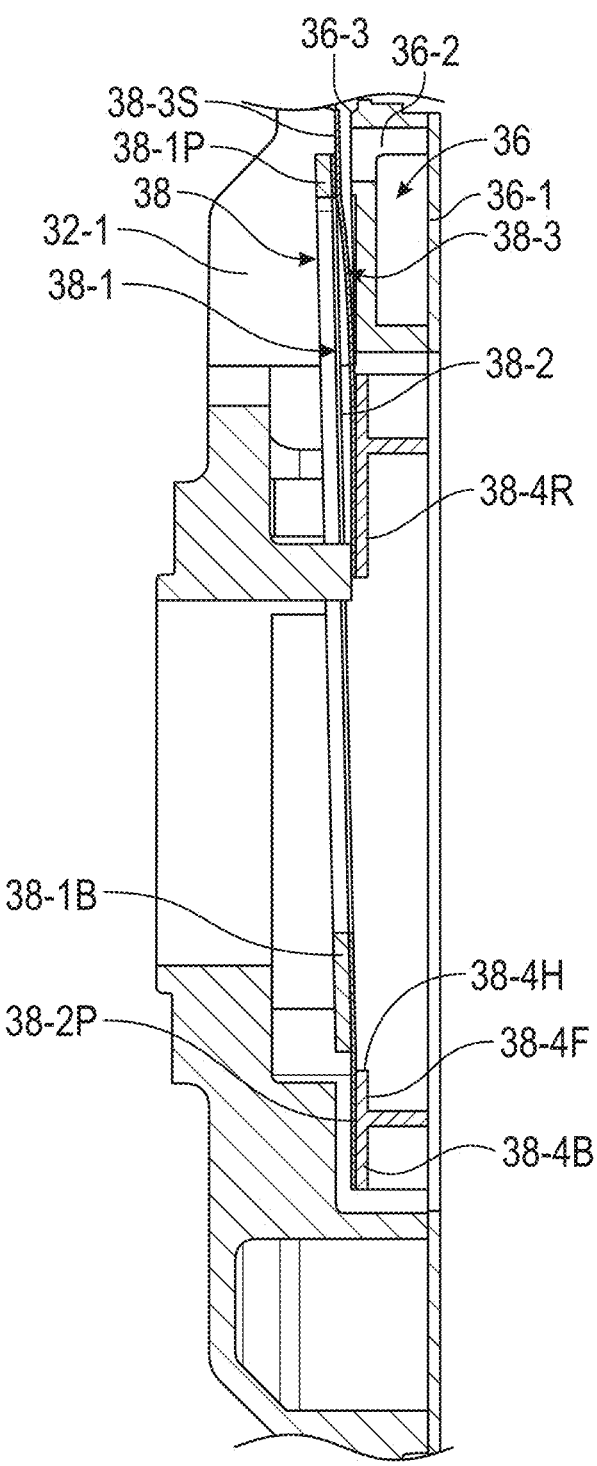
FIG. 4 is a cross-sectional view of the valve subassembly installed on a rotor of the viscous clutch assembly, the valve subassembly and a portion of the rotor shown in isolation.
Figure 5A:
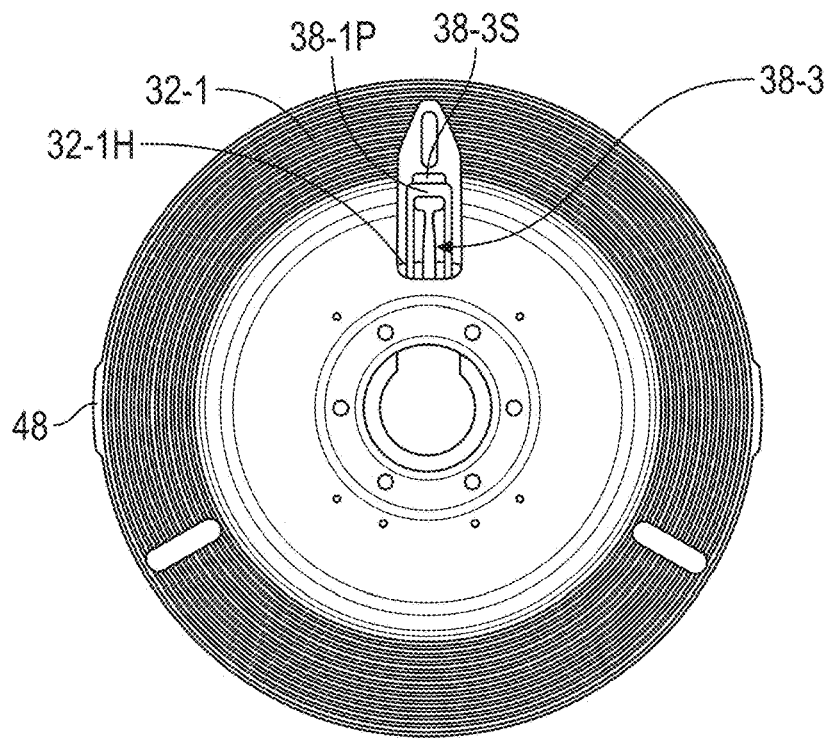
FIG. 5A is a rear elevation view of the rotor and a portion of the valve subassembly, shown in isolation.
Figure 5B:
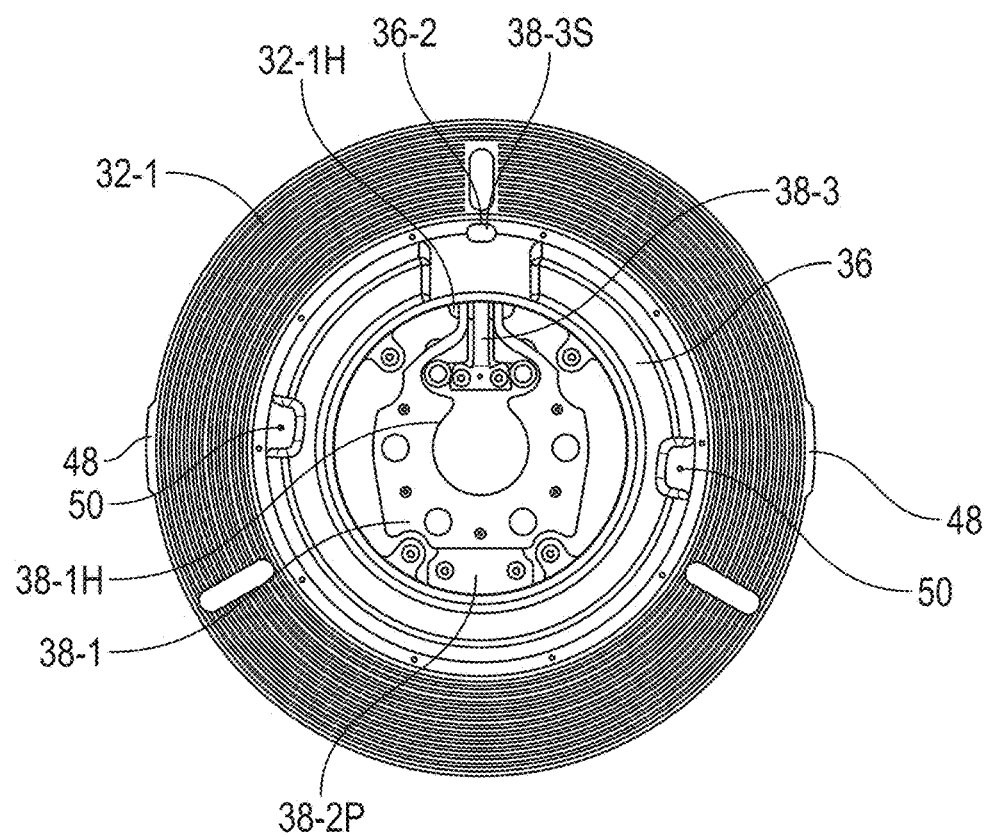
FIG. 5B is a front elevation view of the rotor and the portion of the valve subassembly, shown in isolation.
Figure 6:
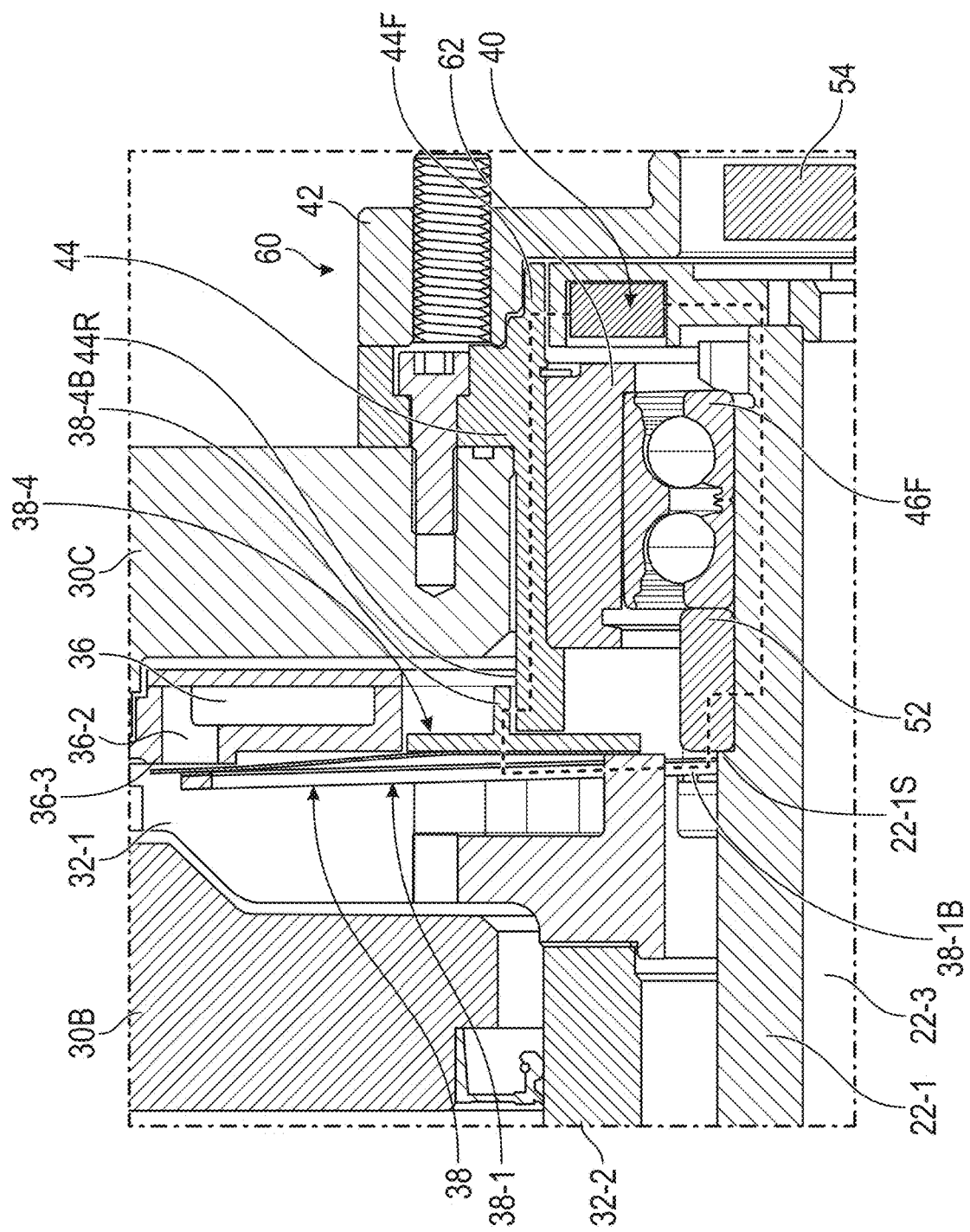
FIG. 6 is a partial cross-sectional view of a portion of the viscous clutch assembly annotated to schematically illustrate a flux circuit.

FIGS. 3A and 3B are a rear and front perspective views, respectively, of the valve subassembly 38, shown in isolation. FIG. 4 is a cross-sectional view of the valve subassembly 38 installed on the rotor 32, but FIG. 4 omits most other components of the clutch mechanism 24. FIGS. 5A and 5B are rear and front elevation views, respectively, of the rotor 32 and a portion of the valve subassembly 38, shown in isolation, with FIG. 5B omitting a portion of the valve subassembly 38 to reveal otherwise hidden components, as explained further below. FIG. 6 is a cross sectional view of a portion of the viscous clutch mechanism 24 of the viscous clutch assembly 20, which is annotated to schematically illustrate a flux circuit.

The armature 38-1 can be a substantially planar plate of magnetically attractive material, such as steel or another ferromagnetic material, and can be substantially rigid. In the illustrated embodiment, the armature 38-1 includes a body 38-1B and a pressing portion 38-1P that extends radially outward from the body 38-1B, and which extends radially outward of a perimeter of the pole 38-4 when the subassembly 38 is fully assembled. There can be an opening (or hole) 38-1H in the armature 38-1 (and of the spring 38-2) that encompasses its center that is of sufficient size to allow the center shaft 22-1 of the mounting bracket 11 to reside axially within (and optionally also other things, such as a portion of the rotor 32). The body 38-1B can thus have a generally annular shape. The armature 38-1 can have one or more additional holes 38-1A in the body 38-1B arranged around and radially outward from the center opening 38-1H. Moreover, in some embodiments, a separate opening can be located in the pressing portion 38-1P. In the illustrated embodiment, the opening 38-1H has an irregular shape and extends into the pressing portion 38-1P, which can give the pressing portion 38-1P a "U" shape, and further can space the armature from certain portions of the reed valve element 38-3. Additionally, the shape of the armature 38-1 can be adjusted to facilitate balancing the overall valve subassembly 38 as a modular unit.

The spring 38-2 is engaged with the armature 38-1, such as by a connection made with one or more suitable mechanical fasteners (for instance, rivets). The spring 38-2 can be a leaf spring, for example, made of a piece of slender spring steel on the order of 0.5 mm thick. One end of the spring 38-2 (for instance at a protrusion 38-2P) is attached to the pole 38-4 (for example, via mechanical fasteners such as rivets or screws). The spring 38-2 permits the armature 38-1 to move relative to the pole 38-4 (and relative to the rotor 32 and the reservoir 36). For instance, the armature 38-1 can be pivotally connected to the pole 38-4 by the spring 38-2, to allow essentially axial pivoting, and the spring 38-2 can bias the armature 38-1 (and its pressing portion 38-1P) away from the pole 38-4 by default. In the illustrated embodiment, the spring 38-2 extends over substantially an entire front side of the armature 38-1 and further includes the protrusion 38-2P extending radially past a perimeter of the armature 38-1 at a location generally opposite the pressing portion 38-1P, for instance, a location diametrically opposed to the pressing portion 38-1P relative to the axis of rotation A in the fully-assembled clutch mechanism 24.

The reed valve element (or valve spring) 38-3 can be attached to the pole 38-4, which in turn is carried by the rotor 32. That is, the reed valve element 38-3 can be indirectly connected to the rotor 32. In the illustrated embodiment, the reed valve element 38-3 is pivotally attached to the pole 38-4 on the same radial side of the axis of rotation A (and of the center shaft 22-1) as the exit of the reservoir outlet bore 36-2 and at an opposite side of the axis of rotation A (and of the center shaft 22-1) from either or both the location where the spring 38-2 is attached to the pole 38-4 and/or the location of a pivot axis for the spring 38-2 and the armature 38-1. This means the reed valve element 38-3 and the spring 38-2 can be secured to the pole 38-4 at locations spaced from each other. In the illustrated embodiment the reed valve element 38-3 is pivotal in essentially the axial direction. The reed valve element 38-3 is generally situated axially in between the armature 38-1 and the outlet bore 36-2 (which can be located in part of disc 32-1 of the rotor 32). The reed valve element 38-3 includes a seal portion 38-3S that has a flat surface of sufficient size to cover the entire exit of the outlet bore 36-2 from the reservoir 36 when closed and has characteristics of a leaf spring to bias the seal portion 38-3S away from the outlet bore 36-2 by default. In some embodiments, a rear side of a boundary wall of the reservoir 36 adjoining a perimeter of the outlet bore 36-2 can be located axially rearward of at least a portion of the pole 38-4 adjacent to the reed valve element 38-3. For example, the seal portion 38-3S can contact the boss 36-3 to cover, close, or seal the outlet bore 36-2, in some embodiments. Such an arrangement allows for substantially unobstructed movement of the reed valve element 38-3, such as pivoting movement without interfering contact with a wall bounding the reservoir 36, while still permitting the seal portion 38-3S to form a relatively good seal in order to block flow of the shear fluid through the outlet bore 36-2. Moreover, such an arrangement reduces tolerance sensitivity to the arrangement of the pole 38-4 and the entire valve subassembly 38 relative to the reservoir 36.

The pole 38-4, which can also be referred to as an outer pole in the present context, is a magnetic flux conducing part that can be included in the valve subassembly 38. The pole 38-4 is carried by the rotor 32, and can be connected to the disc 32-1 with suitable mechanical fasteners, for instance. The pole 38-4 can be made of a ferromagnetic material, such as steel, so as to be able to transmit magnetic flux. In the illustrated embodiment, the pole 38-4 includes a generally annularly-shaped body 38-4B with a center opening 38-4H, a radially inward portion 38-4F (e.g., a flange or region of reduced axial thickness), and a mounting extension 38-4R extending radially inward to which the reed valve element 38-3 can be secured. The inward portion 38-4F can allow the pole 38-4 to at least overlap the flux guide 44 in the axial direction, at least partially, such that a small radial air gap is present between them, as discussed further below. A rear side of the pole 38-4, encompassing the body 38-4B and/or the inward portion 38-4F, can be substantially planar in some embodiments, and that rear side can be located either axially aligned with or axially forward of the exit end of the outlet bore 36-2 at the boss 36-3 in some embodiments. The center opening 38-4H, which can be located inward from the inward portion 38-4F, can be large enough that the center shaft 22-1 can pass through (and optionally also other things as well), but the center opening 38-4H can be smaller than at least some corresponding portions of the perimeter of the armature 38-1 (see FIG. 3A) such that there is overlap between respective portions of the armature 38-1 and the pole 38-4 with a small axial air gap between them at least when the valve subassembly 38 is disengaged, as explained further below. In the illustrated embodiment, an outer perimeter of the pole 38-4 is substantially circular and is larger than the body 38-1B of the armature 38-1. One or more countersink holes, mass-reduction openings or cutouts, and the like can be provided in or on the pole 38-4, such as in the body 38-4B. Such features can help accommodate mechanical fasteners without interference with other nearby components, help to balance the overall modular valve subassembly 38, and/or help reduce mass of the viscous clutch assembly 20, for instance.

As shown in the illustrated embodiment, such as in FIG. 2, the pole 38-4 can be located adjacent to the flux guide 44, with a front side of at least a portion of the pole 38-4 (e.g., the inward portion 38-4F) facing a rear end 44R of the flux guide 44 and with a portion of the pole 38-4 (e.g., the body 38-4B) located radially outward of the rear end 44R of the flux guide 44. The reed valve element 38-3 can be located generally in between the armature 38-1 and the pole 38-4. The spring 38-2 can also be generally located in between the armature 38-1 and the pole 38-4, with the reed valve element 38-3 located between the spring 38-2 and the pole 38-4 in some embodiments. The armature 38-1, the spring 38-2, the reed valve element 38-3, and the pole 38-4 can be assembled and connected together as a modular unit that is pre-assembled before being inserted and secured to other components of the viscous clutch mechanism 24 of the viscous clutch assembly 20, in some embodiments. For example, the entre modular valve subassembly 38 can be secured to the rotor 32 using only fasteners directly engaged with or through the pole 38-4, with other components of the valve subassembly 38 secured to the rotor 32 only indirectly through the pole 38-4, in some embodiments. And, in some embodiments, a portion of the valve subassembly 38, such as at least portions of the pressing portion 38-1P of the armature and the reed valve element 38-3 including the seal portion 38-3S, can be inserted into or through an opening 32-1H in the disc 32-1 of the rotor 32 at a location adjacent to the reservoir 36, such that portions of the valve subassembly 38 are located at front- and rear-facing sides of the disc 32-1 (see, e.g., FIGS. 5A and 5B, noting that in FIG. 5B the pole 38-4 is omitted and the reservoir cover 36-1 is not shown in order to reveal structures that might otherwise be obscured). Use of a pre-assembled modular valve subassembly 38 can facilitate fabrication of the viscous clutch mechanism 24 of the viscous clutch assembly 20, such as by allowing components of the valve subassembly 38 to be connected in locations or using fasteners that would otherwise be inaccessible or simply difficult to work with in a final installed location in the viscous clutch mechanism 24, and can further allow the entire valve subassembly 38 to be balanced as a unit. Use of another pole 52 (which can be referred to as an inner pole in the present context) that is installable on the center shaft 22-1 allows the modular valve subassembly 38 to be installed while still permitting another axial air gap to be present in a flux circuit at or adjacent to the armature 38-1, as discussed further below.

In alternate embodiments, the spring 38-2 and/or the reed valve element 38-3 can be directly attached to the disc 32-1 of the rotor 32 and the pole 38-4 could be excluded from the valve subassembly 38, which can optionally have a non-modular configuration. Moreover, in still further alternative embodiments, a translating armature and/or translating reed valve arrangement could be utilized instead of a pivoting one.

The armature 38-1 is placed in an area of the viscous clutch mechanism 24 where it can be attracted by and move due to the introduction of a magnetic field. As the armature 38-1 is attracted to a magnetic field selectively generated by the electromagnetic coil 40, the armature 38-1 axially moves (e.g., pivots) toward the reservoir outlet bore 36-2. In the illustrated embodiment, the armature is attracted in a generally axial direction to the pole 38-4 and/or the pole 52 against a spring bias force from the spring 38-2 when a magnetic field is generated by the electromagnetic coil 40. When the valve subassembly 38 is actuated, the pressing portion 38-1P of the armature 38-1, and possibly also an adjacent portion of the spring 38-2, in turn exerts a force on the reed valve element 38-3 to move the seal portion 38-3S to cover and block or seal an exit end of the outlet bore 36-2 of the reservoir 36. In some embodiments, operation of the valve can be similar to that described in PCT International Patent App. Pub. No. WO 2012/024497 A2, for instance. Although presently disclosed embodiments provide for a new and different modular construction, with associated new benefits.

The electromagnetic coil 40 is arranged on the front of the viscous clutch mechanism 24, and can include a coil winding and a coil housing. The coil housing can include a mounting flange, which can extend radially inward relative to the coil winding. During operation, the electromagnetic coil can be selectively energized with electrical power in order to selectively generate a magnetic field, which is utilized to control operation of the valve subassembly 38 as explained further below. Such a front-mounted electromagnetic coil arrangement is desirable for simplicity of installation, as well as being in an area where air flow exists allowing the electromagnetic coil 40 to stay cooler. More particularly, the electromagnetic coil 40 can be secured to the center shaft 22-1 of the mounting bracket 11, at or near the front end 22-1F, such that the electromagnetic coil 40 is held rotationally stationary and fixed to the center shaft 22-1.

An output speed sensor 54 (shown only schematically in the drawings) can optionally be fixed to the electromagnetic coil 40, or to another rotationally fixed component adjacent to the electromagnetic coil 40, that can sense a speed of the output of the viscous clutch mechanism 24. As shown in the illustrated embodiment, the output speed sensor 54 senses the speed of the fan adapter 42 relative to its rotationally fixed mounting location. The output speed sensor 54 could be a Hall effect sensor that detects the passing of one or more targets on an adjacent output side clutch component, such as a fan mounting surface of the adapter 42, or another suitable sensing device. Wiring for the electromagnetic coil 40 and the output speed sensor 54 can be bundled together and reside in the bore 22-3 in the center shaft 22-1, which extends axially all along the entire length of the mounting bracket 22 in the illustrated embodiment.

In some applications, it may be desirable to also have a speed sensor (shown only schematically in the drawings) on the input side of the viscous clutch mechanism 24. This can be a stationary input speed sensor 54 mounted at or near the rear end 22-1R of the center shaft 22-1 of the mounting bracket 22 in an area that can sense the speed of the pulley 28 and/or another input side component. This input speed sensor 54 could be a Hall effect sensor that detects the passing of one or more targets on an adjacent input side clutch component, such as on the hub 32-2 or the pulley 28, or another suitable sensing device. The wiring for the input speed sensor 54 can pass through a portion of the center shaft 22-1 of the mounting bracket 22, such as through the auxiliary passage 22-3A and/or the bore 22-3 of the center shaft 22-1, and can be bundled along with the electromagnetic coil wires and output speed sensor wires for ease of installation.

A front hub subassembly 60 can be situated at or near the front end 22-1F of the center shaft 22-1, and includes the flux guide 44, the set of bearings 46F, and an optional flux insulator sleeve 62 made of non-magnetically conductive material. The set of bearings 46F rotatably supports the front hub subassembly 60 on the center shaft 22-1 of the mounting bracket 22, and the front hub subassembly 60 in turn structurally supports the housing 30 on the set of bearings 46F, such as via the cover 30C. In the illustrated embodiment, an outer race of the set of bearings 46F is fixed into the flux insulator sleeve 62. The flux guide 44 and the flux insulator sleeve 62 can be secured together with a snap ring or other suitable retention mechanism. The front hub subassembly 60 can optionally be pre-assembled together as a modular unit that is the installed on the center shaft 22-1 as a unit and then secured to both the center shaft 22-1 (for example, using a threaded nut) and the housing 30 (for example, using mechanical fasteners). The front hub subassembly 60 can be installed after the valve subassembly 38 and the pole 52 are installed, for instance.

The flux guide 44 can be located at an outer diameter of the flux insulator sleeve 62 (or, alternatively, at or near an outer race of the set of bearings 46F in embodiments where the flux insulator sleeve 62 is omitted). In the illustrated embodiment, the flux guide 44 is axially longer than the flux insulator sleeve 62, such that opposite front and rear ends 44F and 44R axially protrude beyond opposite ends of the flux insulator sleeve 62 as well as axially beyond opposite ends of the set of bearings 46F. The flux guide 44 is made of a magnetically conductive material, such as a ferromagnetic material like steel, and allows a magnetic field to be conducted axially from the electromagnetic coil 40 toward the area where the valve subassembly 38 is present. In the illustrated embodiment, the rear end 44R of the flux guide 44 is located adjacent to a portion of the pole 38-4 (e.g., the body 38-4B) with a small radial air gap therebetween, which allows for relative rotation between the flux guide 44 that is carried with the housing 30 and the pole 38-4 that is carried with the rotor 32. Radial air gaps are preferable to axial air gaps in magnetic flux circuits in clutches, in general. Furthermore, the front end 44F of the flux guide 44 is located adjacent to the electromagnetic coil 40. In the illustrated embodiment, the front end 44F of the flux guide 44 is located outward from a housing of the electromagnetic coil 40 separated by a small radial air gap that allows the flux guide 44 to rotate relative to the rotationally fixed electromagnetic coil 40. During operation, the flux guide 44 thus can transmit magnetic flux axially across a portion of the housing 30 (e.g., across the cover 30C) from the electromagnetic coil 40 to the valve subassembly 38 (e.g., to the pole 38-4) as part of the flux circuit. The flux guide 44 can be secured to the housing, such as to the cover 30C, with mechanical fasteners, for instance. The flux guide 44, as well as the optional flux insulator sleeve 62, can thus be rotationally fixed to the housing 30 and can rotate at the same speed as the housing 30 at all times.

The flux insulator sleeve 62, when utilized, is made of material that is not magnetically conductive, such as austenitic stainless steel. The flux insulator sleeve 62 is located radially in between the flux guide 44 and the center shaft 22-1 (and also radially in between the flux guide 44 and the set of bearings 46F), and thus helps to avoid a magnetic short circuit of the flux circuit in a generally radial direction. The flux insulator sleeve 62 can also provide structural support for the housing 30 on the set of bearings 46F. In alternative embodiments, magnetic insulation could instead be achieved using non-magnetic rolling elements in the set of bearings 46F, such as ceramic or austenitic stainless steel balls or rollers, which would allow the non-magnetic sleeve 62 to be omitted if desired.

The adapter 42 for the fan 26 or other output device can be secured to the flux guide 44 (e.g., using mechanical fasteners) and structurally supported by the flux guide 44 as well. The adapter 42 can provide a fan mounting pilot as well as attachment mechanisms such as threaded studs to facilitate securing the fan 26 or other output device to the output side of the viscous clutch mechanism 24. In the illustrated embodiment, the adapter is essentially the forwardmost component of the viscous clutch assembly 20 (excluding the fan 26), located at or beyond the front end 22-1F of the center shaft 22-1 and at least partially covers or caps the electromagnetic coil 40, the output speed sensor 54 (if present), and components of the front hub subassembly 60. Furthermore, in the illustrated embodiment, the electromagnetic coil 40, the fan adapter 42, and the flux guide 44 overlap each other in the axial direction. In alternate embodiments, the adapter 42 could be omitted and the fan 26 or other output device could instead be attached to the cover 30C of the housing 30, for example. Moreover, in some applications the adapter 42 could alternatively be configured as a gear, pulley, or other suitable structure that can engage a desired output device.

The pole 52 is supported on the center shaft 22-1 and is made of a magnetic flux conductive material, such as a ferromagnetic material like steel. In the illustrated embodiment, the inner pole 52 is a sleeve that encircles the center shaft 22-1 at a location radially inward of the pole 38-4 and abuts a radially-extending shoulder 22-1S of the center shaft 22-1 that acts as an axial stop. The pole 52 can directly physically contact the center shaft 22-1, allowing magnetic flux to pass between the pole 52 and the center shaft 22-1 without crossing an air gap. In this way, the pole 52 can help transmit magnetic flux between the armature 38-1 and the center shaft 22-1 in the flux circuit. The set of bearings 46F can axially adjoin the pole 52, such that the pole 52 provides an axial stop for a race of the set of bearings 46F. The pole 52 can be installed on the center shaft 22-1 before the set of bearings 46F and/or the front hub subassembly 60. In the illustrated embodiment, the pole 52 is arranged with the shoulder 22-1S at a rear end and an inner race of the set of bearings 46F at an opposite front end. The pole 52 can protrude radially outward from an adjacent portion of the center shaft 22-1, such as to protrude radially outward from the shoulder 22-1S, with a portion of the armature 38-1 located adjacent to a protruding portion of the pole 52. In other words, a radial thickness of the pole 52 can be greater than a radial dimension of the shoulder 22-1S of the center shaft 22-1. In the illustrated embodiment, the body 38-1B of the armature 38-1 is located adjacent to a rear end of the pole 52 with a small axial air gap therebetween at least when the valve subassembly 38 is disengaged and the armature 38-1 is biased away from the pole 38-4 (see FIGS. 2 and 6). In alternative embodiments the pole 52 can have a different configuration, such as having a smaller radial thickness but having a radially-outward projection or flange adjacent to the armature 38-1. The pole 52 can function as both a portion of a magnetic flux circuit as well as a spacer that helps to hold the set of bearings 46F in place under a clamping load.

FIG. 6 shows a portion of the viscous clutch mechanism 24 with schematic annotation with a dashed line to show the flux circuit through which magnetic flux generated by the electromagnetic coil 40 can pass to the valve subassembly 38 and then back to the electromagnetic coil 40. In the illustrated embodiment, the flux circuit follows a path from a radially outer portion of the coil housing of the electromagnetic coil 40 across a radial air gap to the front end 44F of the flux guide 44, axially along the flux guide 44 to traverse the cover 30C of the housing 30, then from the rear end 44F of the flux guide 44 across a radial air gap to the body 38-4B of the pole 38-4 and axially through the pole 38-4, then across an axial air gap to the body 38-1B of the armature 38-1, radially inward along the armature 38-1 (i.e., toward its center and the axis of rotation A), then across an axial air gap to the pole 52 and through a portion of the center shaft 22-1, and then back to the electromagnetic coil 40 through a radially inner portion of the coil housing and/or its mounting flange. In three dimensions, the flux circuit of the illustrated embodiment has an at least partially toroidal shape (or "doughnut" shape) with the axis of rotation A serving as the axis of revolution of the toroidal shape and a surface of revolution is essentially hollow. Magnetic flux insulating material of the flux insulator sleeve 62, rolling elements of the set of bearings 46F, and/or another suitable component can be located inside or inward from a perimeter of the surface of revolution of the toroidal shape of the flux circuit, spaced from the axis of rotation (i.e., spaced from the axis of rotation A) such that the potential for a magnetic short circuit in the flux path of the flux circuit (for instance, in the radial direction at locations radially spaced from the axis of rotation A) is reduced or eliminated. In the illustrated embodiment, the flux circuit is located entirely to a front side of the rotor 32, such that the flux circuit does not have to pass axially through or axially traverse any portions of the rotor 32. Moreover, in the illustrated embodiment, the flux circuit is located radially inward of the reservoir During operation, as magnetic flux is introduced to the armature 38-1 via the flux circuit to engage the valve subassembly 38 to close the outlet bore 36-2, the armature 38-1 moves toward the electromagnetic coil 40, the flux guide 44, and the poles 38-4 and 52, and the armature 38-1 in turn moves the reed valve element 38-3 such that the seal portion 38-3S covers the outlet bore 36-2. In this way, selectively energizing the electromagnetic coil 40 moves the armature 38-1 against the spring bias force of the spring 38-2 and of the reed valve 38-3. Operation of the viscous clutch mechanism 24 and the viscous clutch assembly 20 can be accomplished by selectively energizing the electromagnetic coil 40 when there is a torque input to control the valve subassembly 38 and in turn regulate the volumetric amount of shear fluid present in the working chamber 34, such that an output speed is controlled to a desired setpoint. In some embodiments, pulse width modulation (PWM) can be used to control energization of the electromagnetic coil 40. Moreover, where the input and/or output sensors 56 and 54 are used, they can provide input and/or output speed feedback to a controller (not shown) that can govern energization of the electromagnetic coil 40 and the automated operation of the viscous clutch assembly 20.

Persons of ordinary skill in the art will recognize that the present invention provides numerous advantages and benefits. For instance, a relatively compact flux circuit having relatively few air gaps (many radially oriented) allows a relatively small electromagnetic coil to be utilized to actuate the valve, which allows for a relatively compact and low-mass clutch assembly. Moreover, the configuration of the electromagnetic coil at the front side of the clutch facilitates assembly and wiring, while the overall clutch assembly allows for relatively convenient fabrication using mostly an axial stack-up of components. Furthermore, embodiments of the present invention allow the use of one or more modular subassemblies, such as the valve subassembly and the front hub subassembly, which can be preassembled as modular units prior to being installed in the rest of the assembly. The use of such subassemblies helps facilitate a generally axial stack-up of components on the center shaft 22-1 of the mounting bracket 22, while the pre-assembly of the subassemblies allow subassembly components to be connected together more easily, such as without obstruction or interference due to the presence of other components supported on or encircling the center shaft 22-1.

Discussion of Possible Embodiments

In some embodiments, a viscous clutch assembly can include: a center shaft having a front end and a rear end opposite the front end, with the center shaft being rotationally fixed; a rotor rotatably supported on the center shaft; a housing positioned adjacent to the rotor and rotatably supported on the center shaft; a working chamber, with the rotor and the housing defining at least portions of a boundary of the working chamber; a reservoir carried by the rotor and rotationally fixed to the rotor; an electromagnetic coil located at or near the front end of the center shaft, the electromagnetic coil being rotationally fixed; a valve subassembly operable to control flow of a shear fluid between the reservoir and the working chamber, with the valve subassembly being controllable using magnetic flux generated by the electromagnetic coil; a flux guide extending axially across a cover of the housing; and a magnetic flux insulating material positioned adjacent to and radially inward from the flux guide. A a flux circuit connects the electromagnetic coil and the valve subassembly. The flux circuit can be located forward of the rotor and can pass through the flux guide and a portion of the center shaft, with the magnetic flux insulating material at least partially surrounded by the flux circuit.

The viscous clutch assembly of the preceding paragraph can optionally include, additionally and/or alternatively, any one or more of the following features, configurations, and/or additional components:

the valve subassembly can include: an outer pole; an armature; a spring securing the armature to the outer pole; and a reed valve element secured to the outer pole, such that actuation of the armature applies a force to the reed valve element to actuate the reed valve element;

the outer pole can have an annular or substantially annular shape and can include a base and an inward portion; a rear end of the flux guide can be positioned at a front side of the inward portion, and the flux guide can be located at an inner side of the base with a radial air gap therebetween;

an inner pole supported on the center shaft and protruding radially outward from an adjoining portion of the center shaft, with the inner pole located adjacent to the armature and radially inward from the flux guide;

the reservoir can include an outlet bore selectively closable by the reed valve element, and the outlet bore can extend through a boss that protrudes from a wall forming at least part of a boundary of the reservoir (e.g., though a portion of a rotor disc that acts as a wall forming part of the boundary of the reservoir);

a bearing set supported on the center shaft that rotatably supports the housing; and an inner pole supported on the center shaft axially in between the armature and the bearing set, such that the flux circuit further passes through the inner pole;

a bearing set supported on the center shaft, and the magnetic flux insulating material can be configured as a flux insulator sleeve positioned radially in between the bearing set and the flux guide, such that the bearing set rotatably supports the housing, the flux guide, and the flux insulator sleeve on the center shaft;

the flux guide can be axially longer than the flux insulator sleeve;

a front end of the flux guide can be separated from the electromagnetic coil by a radial air gap, and/or a rear end of the flux guide can be separated from an adjacent magnetic flux conductive portion of the valve subassembly by another radial air gap;

a fan adapter can be rotationally fixed to the housing adjacent to the front end of the center shaft; and/or the flux circuit can be located radially inward from the reservoir.

A method of making a viscous clutch can include: providing a mounting bracket having a center shaft; rotatably mounting a rotor on the center shaft and positioning a housing base adjacent to the center shaft and the rotor; assembling a modular valve subassembly by: securing a reed valve element to an outer pole made of a ferromagnetic material, securing a spring to an armature, and securing the spring to the outer pole such that, when the modular valve subassembly is fully assembled, the armature is movable relative to the outer pole and further such that at least a seal portion of the reed valve element is located axially between the outer pole and the armature; securing the previously-assembled modular valve subassembly to the rotor; rotatably mounting a housing cover on the center shaft and securing the housing cover to the housing base; and securing an electromagnetic coil to the center shaft at or near a front end thereof such that one or more wires for the electromagnetic coil can extend rearward through a bore in the center shaft.

The method of the preceding paragraph can optionally include, additionally and/or alternatively, any one or more of the following features, configurations, and/or additional steps:

securing a fan adapter to the housing cover such that at least a portion of the fan adapter is positioned at an opposite side of the electromagnetic coil from the housing cover;

mounting an inner pole on the center shaft at a shoulder such that a portion of the inner pole that protrudes beyond the shoulder is axially adjacent to the armature, with the inner pole located between the armature and the electromagnetic coil;

securing a flux guide, a flux insulator sleeve, and a set of bearings between the housing cover and the center shaft;

the flux guide, the flux insulator sleeve, and the set of bearings can be pre-assembled together as a modular front hub assembly prior to being secured to either the housing cover or the center shaft, or at least prior to being secured to one or the other of the housing cover or the center shaft;

prior to securing the previously-assembled modular valve subassembly to the rotor, inserting at least a portion of the previously-assembled modular valve subassembly into an opening in the rotor such that at least the seal portion of the reed valve element is located at a rear side of a reservoir carried by the rotor while a body portion of the armature is located at an opposite front side of the rotor; and/or the modular valve subassembly can be balanced prior to being secured to the rotor;

A modular valve subassembly for a viscous clutch can include: a pole, with the pole including a body having an annular shape, and the pole being made of a ferromagnetic material; an armature made of a ferromagnetic material and configured as a plate; a spring securing the armature to the pole such that the armature is movable relative to the pole; and a reed valve element secured to the pole, with the reed valve element positioned at least partially between the armature and the pole and having a seal portion movable relative to the pole. The reed valve element and the spring can be secured to the pole at locations spaced from each other.

The modular valve subassembly of the preceding paragraph can optionally include, additionally and/or alternatively, any one or more of the following features, configurations, and/or additional components:

the armature can include a pressing portion that extends radially outward from a body portion, a perimeter of the body portion can be smaller than a perimeter of the pole, the pressing portion can extend radially outward of the perimeter of the pole, and an opening can be located at a center of the body portion and can optionally extend into the pressing portion;

the spring can pivotally secure the armature to the pole at a location diametrically opposite to the pressing portion;

the spring can extend over substantially an entire front side of the armature facing the pole;

the spring can be mechanically attached to the armature via a plurality of fasteners;

the spring can be configured to bias the armature away from the pole; and/or the reed valve element can be configured to bias the seal portion away from the pole.

A viscous clutch assembly can include: a center shaft that is rotationally fixed; a rotor rotatably supported on the center shaft; a housing positioned adjacent to the rotor and rotatably supported on the center shaft; a working chamber configured with the rotor and the housing defining at least portions of a boundary of the working chamber such that a shear fluid present in the working chamber can transmit torque between the rotor and the housing; a reservoir carried by the rotor and rotationally fixed to the rotor, the reservoir having an outlet bore; an electromagnetic coil rotationally fixed to the center shaft at or near a front end of the center shaft; a valve subassembly operable to control flow of a shear fluid between the reservoir and the working chamber through the outlet bore and being controllable using magnetic flux generated by the electromagnetic coil; and a front hub subassembly. The valve subassembly can include: an outer pole having an annular body; an armature; a spring pivotally securing the armature to the outer pole; and a reed valve element pivotally secured to the outer pole and having a seal portion arranged adjacent to the outlet bore. The valve subassembly can be configured such that selective actuation of the armature by applied magnetic flux exerts a force on the reed valve element to pivotally actuate the reed valve element against a spring bias force such that the seal portion selectively covers and uncovers the outlet bore. The front hub subassembly can include: a flux guide; a set of bearings; and a magnetic flux insulator sleeve positioned adjacent to and radially in between the set of bearings and the flux guide. The front hub subassembly can be engaged between the center shaft and the housing with the flux guide extending axially across a portion of the housing with a front end of the flux guide separated from the electromagnetic coil by an air gap and with an opposite rear end of the flux guide separated from the outer pole by another air gap.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal or magnetic flux fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

The word "comprise", or variations such as "comprises" or "comprising" are used in an open-ended manner herein and should be interpreted to refer to the inclusion of a stated element, feature, or step, or group of elements, features, or steps, but not the exclusion of any other element, feature, or step, or group of elements, features, or steps. Unless further expressly qualified, use of the word "comprise" or variations thereof does not, alone, exclude the present additional, unrecited elements, steps, or groups of elements or steps. Additionally, unless further expressly qualified, the words "a" and "an" as used herein refer to one or more and do not limit the identified element, feature, step, or the like to one and only one. However, use of the words "a" and "an" herein should be interpreted in accordance with and subject to any applicable further limits expressly stated in the context of any particular instance of usage, without extending such context-specific limits to all other uses generally.

Although the present invention has been described with reference to preferred embodiments, workers skilled in the art will recognize that changes may be made in form and detail without departing from the spirit and scope of the invention. For example, although the disclosed clutch is designed for use with a relatively large displacement engine of 30-50 liters, it could be scaled up or scaled down for any size engine or motor.

The invention claimed is:

1. A viscous clutch assembly, comprising:
a center shaft having a front end and a rear end opposite the front end, wherein the center shaft is rotationally fixed;
a rotor rotatably supported on the center shaft;
a housing positioned adjacent to the rotor and rotatably supported on the center shaft;
a working chamber, wherein the rotor and the housing define at least portions of a boundary of the working chamber;
a reservoir carried by the rotor and rotationally fixed to the rotor;
an electromagnetic coil located at or near the front end of the center shaft, wherein the electromagnetic coil is rotationally fixed;
a valve subassembly operable to control flow of a shear fluid between the reservoir and the working chamber, wherein the valve subassembly is controllable using magnetic flux generated by the electromagnetic coil;
a flux guide extending axially across a cover of the housing; and
a magnetic flux insulating material positioned adjacent to and radially inward from the flux guide,
wherein a flux circuit connects the electromagnetic coil and the valve subassembly, wherein the flux circuit is located forward of the rotor and passes through the flux guide and a portion of the center shaft, and wherein the magnetic flux insulating material is at least partially surrounded by the flux circuit.

2. The viscous clutch assembly of claim 1, wherein the valve subassembly includes:
an outer pole;
an armature;
a spring securing the armature to the outer pole; and
a reed valve element secured to the outer pole, wherein actuation of the armature applies a force to the reed valve element to actuate the reed valve element.

3. The viscous clutch assembly of claim 2, wherein the outer pole has an annular shape and includes a base and an inward portion, wherein a rear end of the flux guide is positioned at a front side of the inward portion, and wherein the flux guide is located at an inner side of the base with a radial air gap therebetween.

4. The viscous clutch assembly of claim 2 and further comprising:
an inner pole supported on the center shaft and protruding radially outward from an adjoining portion of the center shaft, wherein the inner pole is located adjacent to the armature and radially inward from the flux guide.

5. The viscous clutch assembly of claim 2, wherein the reservoir includes an outlet bore selectively closable by the reed valve element, wherein the outlet bore extends through a boss that protrudes from a wall forming at least part of a boundary of the reservoir.

6. The viscous clutch assembly of claim 2 and further comprising:
a bearing set supported on the center shaft that rotatably supports the housing; and
an inner pole supported on the center shaft axially in between the armature and the bearing set, wherein the flux circuit further passes through the inner pole.

7. The viscous clutch assembly of claim 1 and further comprising:
a bearing set supported on the center shaft, wherein the magnetic flux insulating material is configured as a flux insulator sleeve positioned radially in between the bearing set and the flux guide, and wherein the bearing set rotatably supports the housing, the flux guide, and the flux insulator sleeve on the center shaft.

8. The viscous clutch assembly of claim 7, wherein the flux guide is axially longer than the flux insulator sleeve, wherein a front end of the flux guide is separated from the electromagnetic coil by a radial air gap, and wherein a rear end of the flux guide is separated from an adjacent magnetic flux conductive portion of the valve subassembly by another radial air gap.

9. The viscous clutch assembly of claim 1 and further comprising:

a fan adapter rotationally fixed to the housing adjacent to the front end of the center shaft.

10. The viscous clutch assembly of claim 1, wherein the flux circuit is located radially inward from the reservoir.

11. A method of making a viscous clutch, the method comprising:
providing a mounting bracket having a center shaft;
rotatably mounting a rotor on the center shaft, wherein mounting the rotor further includes positioning a housing base adjacent to the center shaft and the rotor;
assembling a modular valve subassembly by:
securing a reed valve element to an outer pole made of a ferromagnetic material;
securing a spring to an armature; and
securing the spring to the outer pole such that, when the modular valve subassembly is fully assembled, the armature is movable relative to the outer pole and further such that at least a seal portion of the reed valve element is located axially between the outer pole and the armature;
securing the previously-assembled modular valve subassembly to the rotor;
rotatably mounting a housing cover on the center shaft and securing the housing cover to the housing base; and
securing an electromagnetic coil to the center shaft at or near a front end thereof, wherein one or more wires for the electromagnetic coil extend rearward through a bore in the center shaft.

12. The method of claim 11 and further comprising:
securing a fan adapter to the housing cover such that at least a portion of the fan adapter is positioned at an opposite side of the electromagnetic coil from the housing cover.

13. The method of claim 11 and further comprising:
mounting an inner pole on the center shaft at a shoulder such that a portion of the inner pole that protrudes beyond the shoulder is axially adjacent to the armature, with the inner pole located between the armature and the electromagnetic coil.

14. The method of claim 11 and further comprising:
securing a flux guide, a flux insulator sleeve, and a set of bearings between the housing cover and the center shaft.

15. The method of claim 14, wherein the flux guide, the flux insulator sleeve, and the set of bearings are preassembled together as a modular front hub assembly prior to being secured to either the housing cover or the center shaft.

16. The method of claim 11 and further comprising:
prior to securing the previously-assembled modular valve subassembly to the rotor, inserting at least a portion of the previously-assembled modular valve subassembly into an opening in the rotor such that at least the seal portion of the reed valve element is located at a rear side of a reservoir carried by the rotor while a body portion of the armature is located at an opposite front side of the rotor.

17. The method of claim 11, wherein the modular valve subassembly is balanced prior to being secured to the rotor.

18. A modular valve subassembly for a viscous clutch, the modular valve subassembly comprising:
a pole, wherein the pole includes a body having an annular shape, and wherein the pole is made of a ferromagnetic material;
an armature made of a ferromagnetic material, wherein the armature is configured as a plate;
a spring securing the armature to the pole such that the armature is movable relative to the pole; and
a reed valve element secured to the pole, the reed valve element positioned at least partially between the armature and the pole and having a seal portion movable relative to the pole, wherein the reed valve element and the spring are secured to the pole at locations spaced from each other.

19. The modular valve subassembly of claim 18, wherein the armature includes a pressing portion that extends radially outward from a body portion, wherein a perimeter of the body portion is smaller than a perimeter of the pole, wherein the pressing portion extends radially outward of the perimeter of the pole, and wherein an opening is located at a center of the body portion and extends into the pressing portion.

20. The modular valve subassembly of claim 19, wherein the spring pivotally secures the armature to the pole at a location diametrically opposite to the pressing portion.

21. The modular valve subassembly of claim 18, wherein the spring extends over substantially an entire front side of the armature facing the pole, and wherein the spring is mechanically attached to the armature via a plurality of fasteners.

22. The modular valve subassembly of claim 18, wherein the spring biases the armature away from the pole, and wherein the reed valve element biases the seal portion away from the pole.

23. A viscous clutch assembly, comprising:
a center shaft that is rotationally fixed;
a rotor rotatably supported on the center shaft;
a housing positioned adjacent to the rotor and rotatably supported on the center shaft;
a working chamber, wherein the rotor and the housing define at least portions of a boundary of the working chamber such that a shear fluid present in the working chamber can transmit torque between the rotor and the housing;
a reservoir carried by the rotor and rotationally fixed to the rotor, the reservoir having an outlet bore;
an electromagnetic coil rotationally fixed to the center shaft at or near a front end of the center shaft;
a valve subassembly operable to control flow of a shear fluid between the reservoir and the working chamber through the outlet bore, wherein the valve subassembly is controllable using magnetic flux generated by the electromagnetic coil, the valve subassembly including:
an outer pole having an annular body;
an armature;
a spring pivotally securing the armature to the outer pole; and
a reed valve element pivotally secured to the outer pole and having a seal portion arranged adjacent to the outlet bore, wherein selective actuation of the armature by applied magnetic flux exerts a force on the reed valve element to pivotally actuate the reed valve element against a spring bias force such that the seal portion selectively covers and uncovers the outlet bore; and
a front hub subassembly including:
a flux guide;
a set of bearings; and
a magnetic flux insulator sleeve positioned adjacent to and radially in between the set of bearings and the flux guide,
wherein the front hub subassembly is engaged between the center shaft and the housing with the flux guide extending axially across a portion of the housing with a front end of the flux guide separated from the electromagnetic coil by an air gap and with an opposite rear end of the flux guide separated from the outer pole by another air gap.

\* \* \* \* \*